INVENTOR.
JOHN STEPHEN KOPPER
BY
Briskin & Goldfarb
ATTORNEYS

FIG. 7

INVENTOR.
JOHN STEPHEN KOPPER
BY
*Briskin & Goldfarb*
ATTORNEYS

United States Patent Office 3,254,484
Patented June 7, 1966

3,254,484
ACOUSTICAL RESONANCE APPARATUS FOR INCREASING THE POWER OUTPUT OF AN INTERNAL COMBUSTION ENGINE
John Stephen Kopper, Henry Whitfield House, Guilford, Conn.
Filed Jan. 23, 1964, Ser. No. 339,625
7 Claims. (Cl. 60—32)

My invention relates to acoustical apparatus for increasing the horsepower output and efficiency of naturally aspirated internal combustion engines by manipulating acoustical effects normally occurring in the exhaust and intake gas columns of such engines. More specifically, the invention relates to means for manipulating sound pressure waves in relation to the intake and exhaust systems of naturally aspirated internal combustion engines, and to means for manually or automatically adjusting the effective acoustical length of the exhaust and intake systems of an engine while the engine is operating and to the addition of resonator and/or sound generators to such exhaust and intake systems in order to: (1) utilize sound pressure waves to assist cylinder charging and cylinder scavenging; (2) achieve resonance of the gas columns in the intake and exhaust systems at all engine speeds and thus increase the amplitude of the sound pressure waves and their resultant effect on cylinder charging and cylinder scavenging; and (3) increase the amplitude of the sound pressure waves in the exhaust and intake systems still further by means of secondary resonators and/or sound generators.

It is well known in the engine art that a higher than normal pressure at the cylinder inlet causes an increased charge to enter the cylinder during the intake stroke and results in higher engine performance. Similarly, engine performance is enhanced when a lower than normal pressure at the cylinder outlet causes a more rapid and thorough exit of the burned charge during the exhaust stroke thus lessening the work done by the piston and helping prevent dilution of the incoming charge. To achieve the former, various pressure-charger devices and ram tubes have been used to compress the charge, and refrigeration devices have been used to increase the density of the charge to achieve the same end. To assist exhaust gas exit, exhaust vacuum fans have been fitted which have smoothly contoured, non-restrictive manifolds, pipes, and mufflers. However, none of these employ acoustical means.

Less well known or beneficially utilized in the engine art is the action of the sound waves generated in an internal combustion engine's intake and exhaust systems. Much inventiveness and design effort has gone into providing for the gross gas flow and inertial effects of intake air passing into, and exhaust passing out of, internal combustion engines. Manifolds, pipes, air filters, mufflers, and other components of the intake and exhaust systems have been designed only with the aim of providing non-restricted gas flow, while the effects of the energy of sound waves in the same systems have been largely ignored. This energy, which expresses itself as a fluctuating pressure, is independent of, but superimposed upon the pattern of gross gas flow. Clearly, energy which is ignored is capable of acting either detrimentally or beneficially on engine performance, depending upon the chance conditions prevailing. The few engine designers who recognized the possible potential of sound waves as a source of energy, have not tried to utilize this energy at any but a single or very narrow band of engine speeds. Heretofore, no one has suggested a means to utilize sound wave energy at all engine speeds. Nor has anyone been able to amplify the sound waves by resonance or supplementary means to heighten their effect on intake and exhaust function.

It is therefore an object of this invention to provide a simple, economical, and compact means of harnessing and increasing the effect of sound waves to enhance engine performance and efficiency and thus to obviate the need for power consuming accessories such as pressure-charger, refrigeration systems, extractor fans and other such engine-driven devices.

It is another object of my invention to utilize the acoustical effects (sound waves), naturally occurring in the intake and exhaust systems of internal combustion engines, to assist in cylinder charging and cylinder scavenging at all engine speeds.

Another object of this invention is to magnify and control the acoustical effects (sound waves) occurring in the intake and exhaust system of an internal combustion engine so that they may be effectively applied to increase the amount of intake air fed to the engine and increase the rate and efficiency of exhaust gas discharge.

It is another object of this invention to utilize resonance as a source of energy to amplify the sound pressure waves in an internal combustion engine and to magnify these waves by acoustic resonators, with or without the introduction of an external energy source such as a sound generator.

It is a further object of the invention to achieve an increase in pressure differential in various functions of an internal combustion engine as a result of magnification of sound pressure waves produced in such engine.

It is another object of the invention to achieve beneficial resonance in the exhaust system at all engine speeds.

It is a further object of the invention to provide a device which will change the effective acoustical lengths of the air-intake pipe and exhaust manifold of an internal combustion engine in accordance with the engine speed to assure correct pulse arrival at an intake or exhaust port and to cause the intake or exhaust tract to resonate at its natural frequency of vibration with strong harmonics so as to amplify the respective acoustical energy intake effect and exhaust effect of the waves in the respective intake and exhaust systems.

Still a further object of the invention is to provide a naturally aspirated internal combustion engine with a simple, compact, efficient, and economical system for increasing the amount of intake air fed to the engine and to increase the rate and efficiency of exhaust gas discharge without the need for equipping the engine with a pressure-charger or mechanical exhaust gas scavenger.

To these ends, and in accordance with one feature of the invention, the air intake tract of the engine is provided with a cylindrical tubular duct having apertures through the outer wall of the duct. A slide member is axially displaceable longitudinally by manual or automatic means to cover a selectively variable predetermined number of these apertures, thus changing the effective acoustical length of the gas column within the air intake tract.

According to another feature of the invention, the exhaust tract of the engine is provided with an extensible telescoping exhaust pipe which leads into a plenum chamber, the effective acoustical length of the gas column being selectively variable by means of a manually or automaticaly longitudinally displaceable rod fixed to one section of the telescopic exhaust pipe.

According to a still further feature of the invention, a resonator chamber is attached, through a neck portion thereof, to the intake tract of the engine at a point near its inlet into the engine, to amplify the sound waves in the gas column of selectively variable acoustical length within the intake tract. Similarly, a resonator chamber can be additionally or altenatively attached, through a neck portion thereof, to the exhaust tract of the engine at a point near its outlet from the engine, to amplify the sound waves within the gas column of selectively variable acoustical length within the exhaust tract.

According to another feature of the invention, either or both of the above-mentioned resonator chambers may be replaced by or supplemented by a sound generator communicating with a respective intake or exhaust duct and controlled from the engine camshaft through a cam and electrical circuit to generate sound waves in synchronized phase with the pulses in the respective intake or exhaust gas columns.

In accordance with another embodiment of the invention wherein the device is operated automatically, a flyball-type mechanism, driven from the engine crankshaft, is attached to a slidable collar to move the latter in accordance with the rotating speed of the crankshaft. The collar is linked through a lever system with the piston of a hydraulic master cylinder. Hydraulic lines from the master cylinder are connected respectively to piston-operated rods located in slave cylinders forming parts respectively of the intake system and the exhaust system of the internal combustion engine. As the engine speed increases, the flyballs move further out, displacing the sleeve and lever to shift the corresponding piston of the master hydraulic cylinder. This forces hydraulic fluid through the hydraulic lines to the slave cylinders in the intake and exhaust systems. In this manner, the positions of a movable intake slide and a movable exhaust pipe sleeve are controlled automatically in dependence upon the engine speed or crankshaft r.p.m., and the effective acoustical length of the intake and exhaust gas columns are thus regulated accordingly.

DEFINITION OF TERMS

*Antinode* is that point in a wave where the particle displacement is at its maximum. In a standing wave of the type produced in intake and exhaust systems, pressure variation is at a minimum at an antinode.

*Closed end organ pipe*—the type of pipe commonly used in an organ to produce a musical sound. Its natural mode of vibration results in a note whose wave length is four times the length of the pipe. Its strongest overtones are at odd number multiples of its natural frequency of vibration. In appearance, it comprises one open and one closed end, with the vibrating sound source placed at its open end.

*Effective length* is that length of a column of gas that determines the length, and hence the frequency, of the sound waves produced in it. It is not necessarily the total length, as, for example, in a flute with one of the finger holes open. The flute has an effective length equal to the distance from the mouth hole to the open finger hole, although its total length is the distance from the mouth hole to the open end of the instrument.

*Exhaust system* is the entire collection of pipes, chambers, manifolds, etc. in contact with and through which the expended (burnt) gases pass on their way from the engine combustion cylinder to the atmosphere.

*Frequency* is the number of cycles or vibrations per second occurring in a continuous sound wave. A cycle is one complete sound wave consisting of a pulse of compression and accompanying pulse of rarefaction. In music it is called pitch.

*Fundamental frequency* is the lowest component frequency of a periodic wave.

*Gas column*—a volume of gas enclosed in a tube and open at either one or both ends.

*Gross gas flow*—all those factors that determine the physical flow of a gas, except the influence of sound waves upon it.

*Harmonic* is a partial or overtone wave whose frequency is an integral multiple of the normal or fundamental frequency of a column of gas.

*Helmholtz resonator*—type of resonator named for the German experimenter of the 19th century and includes all cavity type resonators whose maximum dimension is many times less than the length of the sound wave to which they resonate. Normally it consists of an enclosed volume of gas coupled to a much larger volume of gas by means of a small aperture.

*Node* (nodal point) is that point in a wave at which particle displacement is at a minimum. In a standing wave of the type produced in exhaust and intake systems of internal combustion engines, pressure difference is at a maximum at the nodal point.

*Intake system* is the entire collection of pipes, manifolds, filters, carburetors, etc. in contact with, and through which pass the air and the mixture of air and fuel as these are conducted from the atmosphere to the combustion cylinder for burning.

*Plane wave* is the train of compressions and rarefactions travelling unidirectionally and produced by a single sound source.

*Reflection* is the turning back of a wave upon itself when it encounters an abrupt change in the nature of the medium in which it is travelling. A pulse of compression is reflected back upon itself as a pulse of rarefaction at the open end of a pipe, while a pulse of compression when it encounters the closed end of a pipe.

*Resonance* (forced vibration)—a column of gas has a normal or natural frequency of vibration that is determined entirely by the properties of the gas and its dimensions. Such a column of gas will be set in motion at its natural frequency of vibration (and possibly other, higher frequencies) by impulses introduced to it by outside agents or means. The pulses introduced by an outside agent are called *forced vibrations*. When the frequency of the forced vibrations equals the natural frequency of vibration of the gas column, the column is in *resonance*. The free and the forced vibrations reinforce one another and the sound product is greatly intensified.

*Sound* is an alternation in pressure, particle velocity or particle displacement propogated in an elastic material or the superposition of such propogated alternations.

*Sound wave* is a compression or longitudinal wave in which the pulses of compression and rarefaction travel parallel to the radiating source. Also it is such a wave in any medium regardless of whether it produces sound or not.

*Sound pressure wave* is herein considered to be the wave of pressure produced by and accompanying a sound wave.

*Standing wave*—two waves of equal frequency and amplitude, moving in opposite directions through the same medium produce a standing or stationary wave. Such a wave has stationary nodes where the particle displacement is zero and antinodes where the particle displacement is at its maximum. Standing waves in exhaust and intake systems are considered to result from the reflection of the original sound wave by the atmosphere at the open end of the system.

*Transducer* is herein considered to be a device that translates electrical or mechanical energy into sound energy. A sound wave generator, such as a loud speaker, is a typical transducer in the terms of this invention.

*Wave* is a travelling disturbance in any medium.

*Pulse* is one-half of a single wave, being either the crest of compression or trough of rarefaction.

My invention may be applied to any internal combustion engine capable of generating sound waves, providing such engine has engine functions, such as intake, exhaust, ignition, combustion, etc., which can be improved by applying the energy from sound waves. This invention can be effectively applied to single cylinder or multi-cylinder, four-cycle, two-cycle and two-stroke cycle double-acting gasoline or diesel engines, combustion turbine engines, free piston engines, rotary combustion engines, and reaction engines. For the purposes of illustration, the application of the invention is described herein in connection with its embodiment in a naturally aspirated, single cylinder, four-stroke cycle internal combustion engine. In the examples described hereinafter, a naturally aspirated, single cylinder, two-stroke cycle internal combustion engine has been used.

Other objects, features, and many of the attendant advantages of this invention will be readily appreciated as the same becomes better understood by reference to the following detailed description, general background and theoretical explanation, and examples, when considered in connection with the accompanying drawing, wherein.

Figures 1, 2, 3:
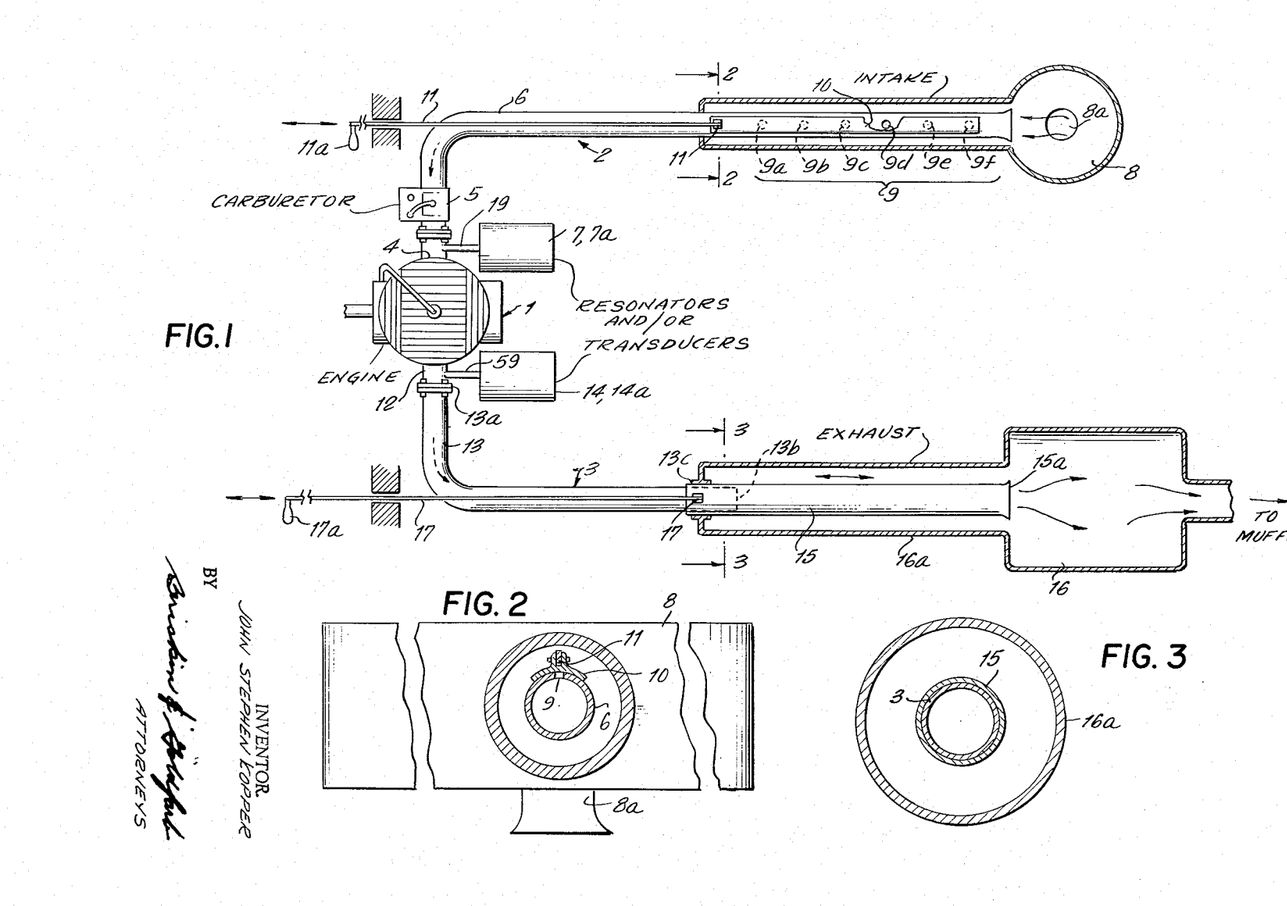
FIG. 1 is a schematic plan view of an engine provided with apparatus according to the invention, and having manual controls for changing the effective acoustical length of the intake and exhaust gas columns.
FIG. 2 is a cross-section taken along line 2—2 of FIG. 1.
FIG. 3 is a cross-section taken along line 3—3 of FIG. 1.

In the drawings, like reference characters designate the same or corresponding parts throughout the several views. There is shown in FIG. 1 a one-cylinder, two-stroke cycle, naturally aspirated gasoline engine 1, mounted on suitable supports and fitted with an intake tract or system 2 and an exhaust tract or system 3. The intake tract 2 comprises a conventional intake port 4, a carburetor 5, and an air intake pipe 6. As more fully described below, a resonator 7 or a transducer 7a, or both, is additionally coupled to the intake pipe 6 at or near the port 4. At the extreme end of the intake pipe 6 is mounted a plenum chamber 8, which houses a conventional air intake filter (not shown). Air enters into the air plenum chamber 8 through an opening 8a (FIGS. 1, 2). At predetermined designated locations along the air intake pipe 6 are located spaced holes 9 (9a, 9b, 9c, 9d, 9e and 9f) whose individual diameters are not less than one-half the diameter of the intake pipe 6. The preferred location of holes 9 are determined by calculations which will be explained presently. The holes 9 are adapted to be covered in sequence by an adjustable intake slide 10, which is arranged to move longitudinally along the air intake pipe 6, and which is controlled by an intake slide operating rod 11 fixed thereto. A handle 11a fixed to the end of rod 11 serves as manual means for setting the longitudinal position of slide 10.

The holes 9 function to change the effective acoustical length of the air intake pipe 6 as they are progressively covered or uncovered in sequence by the adjustable intake slide 10. The adjustable intake slide 10 may be adjusted either manually by handle 11a, or automatically by means described hereinafter, as the speed in revolutions per minute of the engine 1 changes. The selected position of slide 10 is thus adjustable to assure correct timing of the high pressure crest of the intake sound pressure wave at the intake port 4 so as to cause the gas column in the intake tract 2 to resonate at its natural frequency of vibration and strong overtones.

According to a further feature of the invention, in order to further increase the amplitude of the sound pressure wave, the above mentioned resonator 7 (FIG. 4) or a transducer (FIG. 5), or both, is provided in the intake tract 2 as close to the intake port as its dimensions permit, preferably within several inches. The resonator 7 is of the Helmholtz type and comprises a neck portion 19 fixed at one end to the intake pipe 6, a body portion or chamber 18 connected to the other end of the neck portion, and a gas guide 20 fixed within the intake pipe 6 adjacent the neck opening.

Figures 4, 4A:
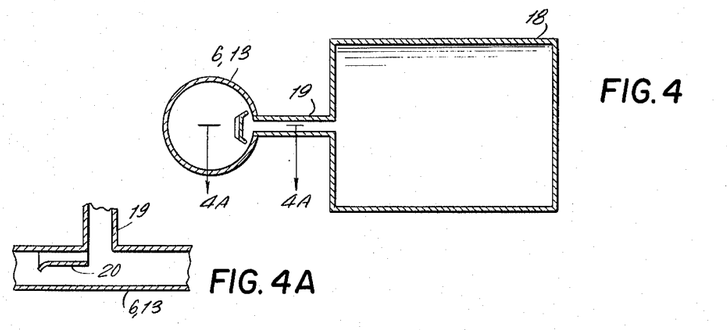
FIG. 4 is a detail of a portion of FIG. 1, showing a resonator in enlarged longitudinal cross section.
FIG. 4A is a cross-section taken along line 4A—4A of FIG. 4, and shows the gas flow guide within the intake or exhaust duct, near the branch neck.

Intake air, inducted into intake opening 8a, travels from intake plenum chamber 8 down the intake pipe 6, where part of the air is deflected by the gas guide 20 so as to pass across the opening of neck 19. This causes a pulstating pumping action of the air flow into and out of the resonator 7, in phase with the intake sound pressure wave created at the port 4 by the engine 1. Part of the kinetic energy of the moving air column is thus transferred to the intake sound pressure wave by increasing the ampltude of this wave. A similar resonator 14 may be located in the exhaust duct, at or near the exhaust port 12 of the engine.

The resonator 7, 14 may be tuned by setting its volume and neck diameter according to Formula IV, listed below, to emit a sound wave with a desired frequency, for example, of 300 cycles/sec., thus reinforcing the first overtone of a sound wave produced at, say, 6000 r.p.m. By making the walls of the resonator 7, 14 telescopic, its volume can be made adjustable to produce sound waves which match in frequency the sound wave generated in the intake tract or exhaust tract at any or all engine speeds.

In addition to, or instead of the resonator 7, 14 of FIG. 4, a transducer or sound generator 7a or 14a (FIG. 5) may be installed in the intake system, in the exhaust system, or both, as near as possible to the respective intake and exhaust ports 4, 12.

Figure 5:
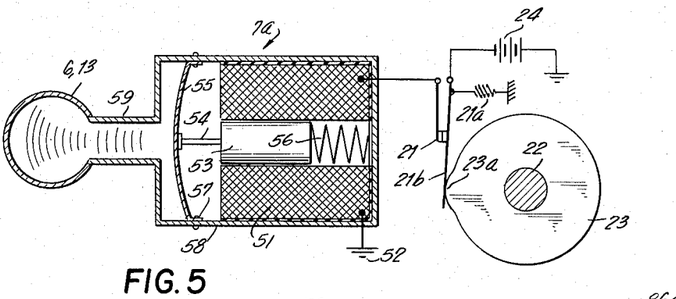
FIG. 5 is a detail of a portion of FIG. 1, showing an electrically operated sound generator in enlarged longitudinal cross section.

The transducer 7a, 14a, shown in FIG. 5 generates sound waves by converting electrical energy to acoustical energy. A cam 23 is fixed to the engine crankshaft 22 and rotates therewith to open and close a switch 21. The lobe 23a of cam 23 moves a follower 21b of switch 21 in opposition to a spring 21a so as to close the switch 21 once each revolution of crankshaft 22. One side of switch 21 is electrically connected to a battery or other power source 24, and the other side is connected to the coil 51 of the transducer 7a, 14a. The other end of the coil 51 is grounded, as shown at 52. The core 53 of the transducer is connected by a rod 54 to a diaphragm 55, circumferentially fixed at 57 to the housing 58 of the transducer 7a, 14a. The core 53 acts in opposition to the force of a spring 56, and causes the diaphragm 55 to produce pulsating sound pressure waves in the neck 59 of the transducer and thus in the respective intake tract 6 or exhaust tract 13 connected to the neck 59. The shape of the cam 23 and its angular position on the periphery of the crank shaft 22 determine, respectively, the shape and phasing of the sound wave generated by the transducer 7a, 14a. The respective diameters of the intake tract and of the exhaust tract are maintained as uniform as possible throughout their respective lengths. To accomplish this in the intake tract, the intake pipe 6, its intake port 4 and the duct through the carburetor 5 are each preferably built so that they have circular bores which exactly register at their mutual junctions.

The exhaust tract 3 comprises an engine exhaust port 12, of conventional construction, and an exhaust header pipe 13. The exhaust pipe 13 is equipped with a resonator 14, or a transducer 14a, or both a resonator and transducer, each connected as closely as possible, preferably within a few inches, to the exhaust port 12. The resonator 14 corresponds to that illustrated in FIG. 4 and above discussed relative to the intake tract. The transducer 14a corresponds to that illustrated in FIG. 5 and is similar to that above discussed relative to the intake tract 6. The exhaust tract 3 is provided with a telescopic portion 15 in order to make the exhaust tract extensible. The exhaust pipe portion 13 terminates at 13b within the portion of reduced diameter 16a of a plenum chamber 16. A slidable sleeve 15 fits over the cylindrical portion of pipe 13, and is provided with seals at 13c, between the sleeve 15 and the plenum chamber portion 16a, as well as between the sleeve 15 and the cylindrical portion of pipe 13. The seals 13c are preferably substantially gas-tight. A rod 17 is fixed to the sleeve 15, and is provided with a handle 17a for longitudinally displacing rod 17 and sleeve 15, to increase or decrease the effective acoustical length of the exhaust tract 3. A conventional muffler 91 and tail pipe 92 are shown in FIG. 7, but their position and function do not affect the invention as long as the exhaust plenum chamber 16 is interposed between them and the extensible exhaust tract 3, 15.

The operation of the extensible exhaust pipe 3 is somewhat similar to that above described relative to the adjustable intake slide 10 and holes 9 in the intake tract 2. The position of handle 17a and rod 17 determines the axially displaced position of sleeve 15, and thus determines the effective acoustical length of the exhaust tract 3. The longitudinal position of the exhaust pipe sleeve 15 is controlled by the operating rod 17, which is manually adjusted by handle 17a, or automatically adjusted by the device of FIG. 6, the manual or automatic adjustment being in accordance with the speed or r.p.m. of the engine as such engine speed changes. The exhaust pipe sleeve 15 is thus moved so as to assure the correct cyclic timing of the low pressure trough of the exhaust sound pressure wave occurring as a pulse at the exhaust port 12, and to cause the gas column in exhaust tract 3 to resonate at its natural frequency of vibration and strong overtones.

The exhaust header pipe and the exhaust port 12 have equal circular bores which exactly register at their common junction 13a. The bore of the exhaust header pipe 13 extends without change in size to its end 13b within the portion 16a of the plenum chamber 16. The inner diameter of sleeve 15 is as close as possible to the outer diameter of pipe 13 without impairing its telescopic slidability, so that at all engine speeds the extensible gas column within the exhaust tract 3 maintains substantially the same diameter up to the outlet 15a of the sleeve 15, from which the exhaust gas passes into the plenum chamber 16 or its portion 16a. The exhaust plenum chamber 16 preferably has a volume at least 15 times the displacement volume of the engine.

Figure 6:
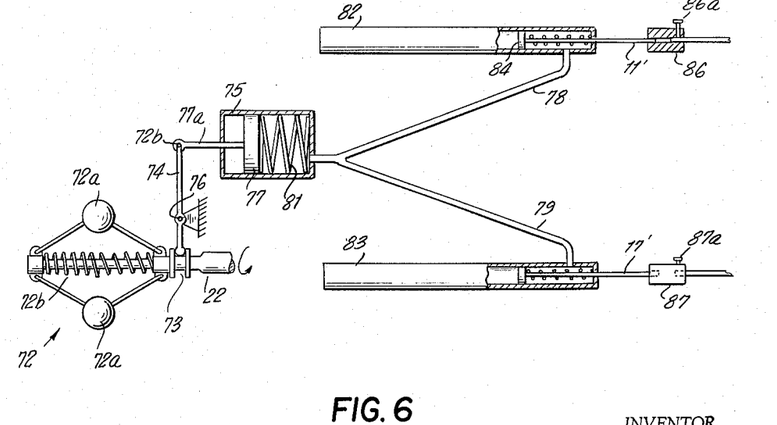
FIG. 6 is a schematic diagram illustrating another embodiment of the invention having automatic means for controlling the positions of the control rods for variably setting the effective lengths of the gas columns in the intake and exhaust systems in accordance with variations in the engine speed.
Figure 7:
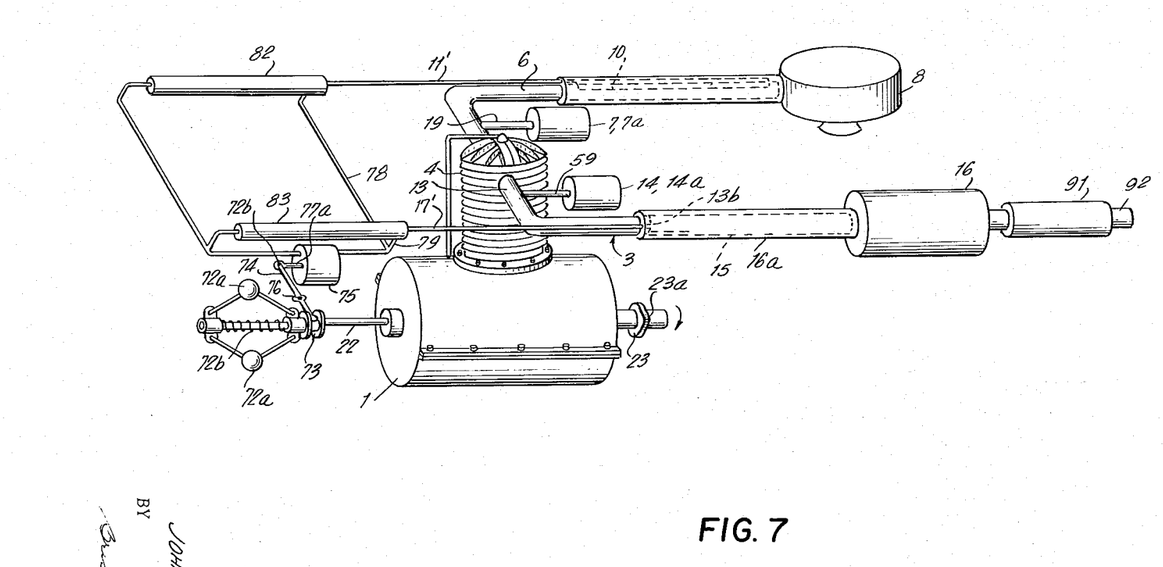
FIG. 7 is a perspective view of an engine, with intake and exhaust system and provided with the automatic means of FIG. 6.

In FIGS. 6 and 7, means are shown for automatically adjusting the effective acoustical length of the intake tract 2 and of the exhaust tract 3 while the engine is running. The engine crankshaft 22 turns a centrifugal flyball mechanism 72, causing the balls 72a thereof to move outwardly under centrifugal force. A collar 73 is linked to the flyballs and is axially slidable on a shaft. As the flyballs move outwardly, the collar 73 linked to them slides toward the left relative to FIG. 6, and operates a lever 74, pivoted at 76, so as to rotate the lever 74 clockwise. A piston rod 77a is linked at 77b to the lever 74, and is connected to a piston 77 reciprocable in a hydraulic master cylinder 75. The pitson 77 operates against the pressure of a spring 81 within the cylinder 75. The hydraulic master cylinder 75 is connected to hydraulic lines 78 and 79 which in turn are connected to hydraulic slave cylinders 82 and 83 in which slave pistons 84 and 85 are reciprocable. The pistons 84 and 85 are respectively joined to the intake slide rod 11' and the exhaust sleeve slide rod 17'. Initial adjustment of the length of the rod 11' and 17' is possible by means of adjustable couplings 86 and 87, provided with set screws 86a and 87a.

Operation of the device of FIG. 6 is as follows:

As the engine speed increases, the crankshaft 22 rotates more rapidly in the direction indicated by the circular arrow, and the flyballs 72a move outwardly against the pressure of the variable-rate helical spring 72b, sliding the collar 73 toward the left relative to FIG. 6. This causes the lever 74 to rotate clockwise around the pivot 76 and to displace the piston rod 77a and the piston 77 toward the right against the pressure of spring 81. The hydraulic master cylinder 75 thus forces hydraulic fluid into the hydraulic lines 78 and 79. The hydraulic fluid flows through these lines to the intake hydraulic slave cylinder 82 and the exhaust hydraulic slave cylinder 83. The hydraulic slave cylinders 82 and 83 respond to the flow of fluid from the master cylinder 75 in such manner that the greater the pressure from the master cylinder, the further the pistons 84 and 85 in the slave cylinders will move. Movement of the pistons 84, 85 of the hydraulic slave cylinders 82 and 83 axially displaces the intake slide operating rod 11', to move the cover 10 relative to the series of holes 9 (see FIG. 1). Movement of the piston 85 displaces a rod 17' to axially move the sleeve 15 relative the cylindrical portion 13 of the exhaust tract (see FIG. 1). In this manner the respective positions of the adjustable intake slide 10 and the adjustable exhaust pipe sleeve 15 are automatically controlled by the flyball regulator means 72, and the effective acoustical length of the intake and exhaust gas columns are thus regulated and varied in accordance with the engine speed. The initial length of the two operating rods 11' and 17' are calibrated and set by means of the connecting collars 86, 87 with their set screws 86a and 87a.

For the purpose of better understanding the invention, the following general background and theoretical explanation is provided, together with typical examples illustrating how numerical dimensions of various effective acoustical lengths can be determined mathematically.

GENERAL BACKGROUND AND THEORETICAL EXPLANATION

Although it is well known that an internal combustion engine produces sound waves in its intake and exhaust systems, heretofore the effects of these waves have been generally ignored as a source of energy to increase engine performance. The so-called harmonic-induction engine does not use sound wave pressure to achieve its results. Exhaust and intake "ramming" and "tuning" have been used on racing motorcycles and racing cars to increase power and have even been employed commerically in some automobile engines. However, these methods of increasing power do not involve sound pressure waves. Moreover, heretofore, no one has sought to amplify such sound waves by resonance or by supplementary means such as a sound generator, and thus to increase the benefits which may be derived from these sound waves originate and how they acect engine performance will now be considered.

As the piston of an internal combustion engine descends in its cylinder on the power stroke, the burned charge is exhausted from the cylinder through a suddenly opening valve. The impingement of this high velocity discharge on the column of gas enclosed in the exhaust system causes a pulse of compression to travel outwardly toward the open end of the exhaust system. Immediately following the pulse of compression in the wave comes a pulse of rarefaction, and a plane sound wave is thereby generated in the exhaust system. At the open end of the system, the original pulse of compression is reflected by the atmosphere back up the exhaust pipe as a pulse of rarefaction; this is in turn followed by its pulse of compression, causing a standing wave to be established in the exhaust system. The frequency, and consequently the length, of this standing wave can be calculated by analogy of the entire system to a stopped or closed-end organ pipe. The frequency may thus be expressed by the formula:

(I) $$f = V/4L$$

where:

$f$ = Frequency of the wave in cycles per second
$V$ = Velocity of sound in the exhaust gas in feet per second
$L$ = Length of the exhaust system from valve to atmosphere, in feet.

Actually, a typical exhaust system differs acoustically from the closed-end organ pipe in two ways. First, it does not have a constant bore diameter, although for the sake of simplicity it is assumed to have one in this explanation. Secondly, the source of the sound waves in an exhaust system is at the closed (piston) end instead of at the open end, and in an organ pipe.

The standing sound wave generated in an engine exhaust system as above described exhibits one characteristic that can greatly influence engine performance; namely, a fluctuating pressure-differential at the nodal point. In the exhaust system, the nodal point is located at the exhaust port of the engine, and the resulting pressure varies in a constant pattern, changing at the speed of sound travelling in the exhaust gas, the variation amounting to more than several pounds per square inch. This pressure variation pattern is of wave form, and will hereafter be referred to as a "sound pressure wave." A typical situation illustrating such a pressure variation is described at page 65 of "Exhaust and Intake Systems," by Philip H. Smith, published by Robert Bentley, Inc., 1962, where there is illustrated in graphic wave form a pressure variation of −6 lb./sq. in. gauge to +6 lb./sq. in. gauge travelling through the exhaust gas at the speed of sound, ranging from 1300 ft./sec. to 1700 ft./sec., depending on the engine speed and other variables.

Depending upon where in the engines's cycle the high and low pressures occur, the above-described type of sound pressure wave is capable either of benefiting, of having no effect upon, or of hindering the engine performance. For example, if an extremely low pressure trough of the wave coincides with the overlap period when both intake and exhaust valves are open at top dead center of the exhaust stroke, then the results will be highly favorable and beneficial. The low pressure existing in the port at this moment, when the cylinder pressure is at, or near, atmospheric would: (1) help extract any remaining exhaust gas and thus prevent dilution of the incoming charge; and (2) would help draw in the incoming charge of fuel and air by creating a lower-than-normal cylinder pressure. This latter result is, in effect, a "free supercharge" effect, creating as it does a greater pressure differential between cylinder and atmosphere, and thus boosts volumetric efficiency.

If degrees of crankshaft rotation are plotted on a graph against exhaust port pressure or cylinder pressure, as illustrated in the above-mentioned book by Philip H. Smith, then during the overlap period of crankshaft rotation when the intake and exhaust valves are both open, the correct length of exhaust pipe will produce a beneficial curve so as to cause a low cylinder pressure during this overlap period. Conversely, if a high pressure peak in the exhaust port coincides with this overlap period in the cycle, engine performance will be negatively affected. Between these extremes of best beneficial effect and most detrimental effect, there lies a zone ranging from positive to negative effects. Within this zone, there is a point where there are no effects at all, beneficial or detrimental, produced by a respective effective length of exhaust pipes.

The effective length of the exhaust system for producing a particular point in a beneficial pressure wave may be determined from the following formula.

(II) $\qquad L = TV/\text{r.p.m.}$ where:

$T$ = Time, expressed in degrees of crankshaft rotation between the beginning of the exhaust or intake cycle and the start of a low or high pressure wave at the cylinder port.
$V$ = Velocity of sound in the exhaust gas. This velocity should be measured for each engine but ordinarily varies between 1300 and 1700 ft./sec.
$L$ = Length of intake or exhaust system, measured in inches, and assuming a constant bore size of the respective system.
r.p.m. = Revolutions per minute of the engines.

Changing the engine speed (r.p.m.), of course, changes the period or time in a cycle over which the sonically-produced high and low port pressures operate. However, this is provided that the length L of the exhaust system remains fixed, which is the case in conventional exhaust systems. Therefore, what constitutes a favorable influence or beneficial pressure wave at one engine speed will be an unfavorable and detrimental influence at another engine speed, when the length of engine exhaust system remains the same. Thus, all internal combustion engines heretofore produced, since they have a fixed length exhaust system, exhibit the above described disadvantages and resulting difficulties.

Another factor to be considered to overcome the disadvantages of the prior art, is the occurrence, or non-occurrence of resonance in the exhaust system. Resonance will exist if the natural frequency of the exhaust system, or one of its overtones, closely matches the number of exhaust impulses (forced vibrations) supplied by the engine per unit of time. That is, resonance will occur when, per unit of time, the number of sound waves produced by the engine match the number of sound waves existing in the exhaust system, determined as a function of its length (natural frequency) by Formula I above: $f = V/4L$. For example, a one cylinder four-stroke cycle engine produces one exhaust impulse every second revolution. Therefore at, say, 3000 r.p.m. the engine will supply forced vibrations at the rate of 25 cycles per second. (3000 r.p.m.; divided by 2 times 60 sec./min. = 25 cycles/sec.). To have resonance occur, the effective length of the exhaust system at that engine speed must be:

$$L = 1300 \text{ ft./sec.}/4 \times 25 \text{ cycles/sec.} = 13 \text{ ft.}$$

It would also be possible to resonate the 3rd harmonic (or the 5th or the 7th, all of which are strong in the tone produced by a closed end organ pipe) of the exhaust system, in which case the effective length would be ⅓ × 13 ft. or 4.3 ft.

To achieve the above stated aims and objects of my invention it is necessary to control and manipulate the sound pressure waves by the particular design of the intake and exhaust systems. The intake and exhaust systems are preferably so constructed to achieve beneficial resonance in the exahust system at various engine speeds, so that the following conditions are fulfilled. First, the effective length of the exhaust system must be such that the negative low pressure pulse arrives back at the exhaust port just at the moment when it will be of most benefit. This, as explained above, requires an exhaust system of variable effective acoustical length which is coordinated to match the engine speed. Second, the length of the exhaust system thus obtained must vibrate at its natural frequency of vibration, or at one of its strong harmonics or overtones, exactly in time with the number of forced vibrations supplied by the engine as determined by its speed in revolutions per second. For achieving beneficial resonance in the exhaust system at all engines speeds, the effective length of the exhaust system must be such that the positive pulses supplied by the cylinder are in phase (i.e. positive phase of the wave coinciding with positive pulses) if the residual wave is not to be damped out.

To supplement the foregoing conditions, additional resonating chambers may be placed in the intake and exhaust systems in such a way that they convert some of the kinetic energy of the moving gas columns into the sound pressure waves. Furthermore, in addition to, or in place of such resonating chambers, the sound pressure waves may be amplified by means of a sound wave transducer or sound generator, which draws energy from an outside source and converts it to sound wave energy. The explanation below describes how dimensions of structures according to the invention to achieve these conditions may be calculated.

For the sake of simplicity, in making mathematical approximations, it is assumed that the gas columns of variable length within the intake system and within the exhaust system have a constant circular cross section. It is further assumed that the intake plenum chamber 8, the exhaust plenum chamber 16, 16a, or the equivalent atmospheric surroundings from which air is received or into which exhaust gas is discharged, have a respective capacity or volume of at least 15 times the volume of a single cylinder of the engine. Of course, my invention can be applied to designs and structures which depart from these assumptions, but the mathematical relationships given below would have to be adjusted accordingly.

Expressed mathematically, the first two of the above conditions are satisfied when the effective acoustical length of the exhaust system, as determined by the above Formula II, equals the length calculated by Formula I. The variable effective length, $L_1$, $L_2$, $L_3$ or $L_4$, etc., can in this manner be determined by the above Formula II.

The first condition above requires that the correct low pressure trough or the high pressure crest of a wave coincides in time with a certain point in the engine's intake or exhaust cycle. This condition is satisfied by selecting the correct value for T in Formula II, expressed in degrees of crankshaft rotation.

Changing the value of T changes the area or zone in the engine's intake or exhaust cycle when the higher or lower than normal pressure occurs at the cylinder's inlet or outlet. A value for T must be selected for each engine, accounting for valve timing (if the engine is a four-stroke cycle type) or port timing (if the engine is a two-stroke cycle type) and other variables. In other words, a higher or lower-than-normal pressure may be made to occur wherever desired by changing the value of T and adopting the new effective length $L_1$ calculated by the equation of Formula II. The adjustable length intake and exhaust systems provided by the invention are adjusted to the calculated length. From the equation, Formula II, it is apparent that a new value L will be obtained with each change in the engine speed (r.p.m.). The adjustable nature of the effective lengths of the intake and exhaust systems in the invention permits changing the lengths $L_1$, while the engine is running, so that the selected value of T remains constant.

The second condition, which requires the effective acoustical lengths of the intake and exhaust system to be such that they resonate at their own natural frequency of vibration, or at one of its overtones, in time with the forced vibration supplied by the engine, is satisfied in the following manner. The length of the intake or exhaust system, between the cylinder and the plenum chamber, may be compared to a stopped, or closed end, organ pipe. That is, the intake or exhaust system, being closed at one end (at the engine's cylinder) and open at the other end has a fundamental period or frequency of vibration, as does the organ pipe. This frequency is expressed by the following equation:

(III) $$f_1 = V/4L_2$$

$f_1$ = Fundamental frequency of the sound wave, in cycles per second.
$V$ = Velocity of the sound wave, in ft./sec., in the intake and exhaust gas columns. This should be measured for each engine and is subject to the same variables as V in Formula II.
$L_2$ = Effective length, in feet, of the intake or exhaust system.

The natural, and hence strong, overtones of such a stopped end pipe are the odd numbered harmonics:

$f_3$ = 1st overtone, 3rd harmonic of the fundamental frequency.

$$f_3 = 3f_1$$

$f_1$ = Fundamental frequency.

$$f_5 = 5f_1$$

$f_5$ = 2nd overtone, 5th harmonic of the fundamental frequency.

$$f_7 = 7f_1$$

$f_7$ = 3rd overtone, 7th harmonic of the fundamental frequency.

Thus, it can be seen that the intake and exhaust systems have a fundamental frequency of vibration, $f_1$, and several strong overtones, $f_3$, $f_5$, $f_7$, etc., that are a function of their effective lengths. Also it is apparent, that while using my invention to adjust the effective acoustical lengths, the fundamental frequency of vibration and its overtones will change as the intake and exhaust systems are adjusted in length while the engine is running. The number of forced vibrations supplied by the engine and resulting from the sudden opening of the engine's intake and exhaust valves or ports must equal the fundamental frequencies of vibration, or one of their overtones, of the intake and exhaust systems as a function of their respective effective lengths. The number of forced vibrations per unit of time changes, of course, with engine speed and so must the effective lengths of the intake and exhaust systems if resonance is to occur. To satisfy the second condition then, the following relationship must exist:

(IV) $\quad\quad f_1$ or $f_3$ or $f_5$ or $f_7 = f_e$ $f_1$, $f_3$, $f_5$, $f_7$ = Fundamental frequency of vibration, or one of its overtones, in cycles per second, of the intake or exhaust system as determined by Formula III.
$f_e$ = r.p.m./60 × number of cylinders connected to the exhaust or intake pipe, for a two cycle engine.
$f_e$ = r.p.m./120 × number of cylinders connected to the exhaust or intake pipe, for a four-cycle engine.

The adjustable nature of the intake and exhaust system and their change in effective length with changes of engine speed, using my invention, permits the selection of a length $L_2$, which will satisfy Formula IV at all engine speeds.

It may be, however, that the length $L_1$, obtained by Formula II, and the length $L_2$, obtained by Formula III, are not equal. In such case, either a new value for $f_e$, in Formula IV, must be found by varying the number of cylinders using a common intake or exhaust pipe, or less than theoretically perfect resonance by Formula IV must be settled for. It is the nature of a resonant system that the number of forced vibrations need not exactly equal the fundamental frequency of the system to obtain a large increase in amplitude of the sound pressure wave.

The additional above conditions, in which secondary resonators and/or sound generators are placed in the intake and exhaust systems so as to further amplify the sound pressure waves, are satisfied as follows. Any of several different types of resonators may be employed to transfer some of the kinetic energy of the moving gas columns to sound wave energy. Musical instruments of the trumpet, clarinet, flute, and ocarina families accomplish resonance by converting the stream of air from the player's lips to musical tones but do not serve to amplify intake and exhaust sound pressure waves. For the embodiment of this invention utilizing a resonator, a gas blown resonator of the Helmholtz type is used. It has a fixed pitch but could be manually or automatically adjusted to duplicate the sound waves generated in the intake and exhaust systems at all engine speeds. To do so, only the resonator's volume would have to be changed as the engine speed changes. Formula V, below, is used to obtain the correct dimensions to produce a sound wave of the required frequency.

(V)
$$f_r = \frac{1}{2\pi\sqrt{MC_A}}$$

$f_r$ = Resonant frequency of the resonator. This is the frequency of the intake or exhaust sound wave that it is desired to amplify and, hence, should equal $f_e$ in Formula IV.

$$M = \frac{\rho(l - 1.7R)}{\pi R^2}$$

$$C_A = \frac{V}{\rho c^2}$$

$C_A$ = Acoustical capacitance.
$R$ = Radius of neck in cm.
$l$ = Length of neck in cm.
$c$ = Velocity of sound in that particular medium. It will equal $V$ in Formulas I and II.
$\rho$ = Density of the medium in grams per cubic centimeter.
$V$ = Volume of resonator in cubic centimeters.

The sound wave generated by the Helmholtz type resonator will automatically be in phase with the sound wave in the intake or exhaust system provided it is positioned close (within several inches) to the cylinder end of the intake or exhaust system.

In addition to, or in place of, the resonator, a sound wave generator in the form of an electrically powered transducer 7a, 14a is employed. This transducer is timed (phased) with the intake or exhaust sound wave by means of an engine driven cam that opens and closes a switch connected to both the electrical energy source and the transducer. To obtain the correct cam profile, the intake and exhaust sound waves must be analyzed on an oscilliscope and the cam cut to reproduce the exact shape of the sound waves. With the transducer spaced close to the cylinder port, the cam is circumferentially positioned on the crankshaft in such a way that the cam just closes the switch (if connected to the exhaust) or just opens the switch (if connected to the intake) as the exhaust or intake cycle begins.

*Example I*

The following example is given of the exhaust tract an actual embodiment of the invention:

The holes 9 in the intake pipe 6 are located the following distances for the intake port 4:

Effective length of intake tract as determined by Formula II and assigning a value for T of 58 degrees of crankshaft rotation—this value of T is considered by the inventor to be the optimum for engine performance, because it empirically produced maximum power increase in this typical embodiment. $V = 1100$ ft./sec., the velocity of sound in air under ordinary ambient temperature conditions.

3000 r.p.m., $9_f = 21.3$ in.
4000 r.p.m., $9_e = 16$ in.
5000 r.p.m., $9_d = 12.76$ in.
6000 r.p.m., $9_c = 10.63$ in.
7000 r.p.m., $9_b = 9$ in.
8000 r.p.m., $9_a = 8$ in.

Calculating the length of intake tract, for a two-stroke engine, to achieve resonance of the first overtone, third harmonic, using Formulas III and IV. $V = 1100$ ft./sec.

3000 r.p.m., $f = 150$ cps., $9_f = 21.5$ in.
4000 r.p.m., $f = 198$ cps., $9_e = 16.75$ in.
5000 r.p.m., $f = 249$ cps., $9_e = 13$ in.
6000 r.p.m., $f = 300$ cps., $9_c = 11$ in.
7000 r.p.m., $f = 351$ cps., $9_b = 9.5$ in.
8000 r.p.m., $f = 399$ cps., $9_a = 8.25$ in.

Since it is more important to assure correct pulse arrival than to get perfect resonance, the position of the holes are made to agree with the results obtained by Formulas III and IV.

*Example II*

An actual example for determining preferred positions of the adjustable exhaust pipe 15 are as follows:

The positions of the adjustable exhaust pipe 13, 15 and thus the effective length of the exhaust tract 3 (not including the plenum chamber 16) is determined as follows:

Effective length of the exhaust tract as determined by Formula II and assigning a value for T of 60 degrees of crankshaft rotation—this value of T is considered by the inventor to be the optimum for engine performance, because it empirically produced maximum power increase in this typical embodiment. $V = 1300$ to $1700$ ft./sec.

3000 r.p.m., $V = 1400$ ft./sec.  $L = 2$ ft. 4 in.
4000 r.p.m., $V = 1400$ ft./sec.  $L = 1$ ft. 9 in.
5000 r.p.m., $V = 1500$ ft./sec.  $L = 1$ ft. 6 in.
6000 r.p.m., $V = 1550$ ft./sec.  $L = 1$ ft. 3½ in.
7000 r.p.m., $V = 1600$ ft./sec.  $L = 1$ ft. 1½ in.
8000 r.p.m., $V = 1700$ ft./sec.  $L = 1$ ft. 1 in.

Calculating the length of the exhaust tract, for a two-stroke engine, to achieve resonance of the third harmonic using Formula II. $V = 1400$ to $1770$ ft./sec.

3000 r.p.m., $f = 150$ cps., $L = 2$ ft. 4 in.
4000 r.p.m., $f = 198$ cps., $V = 1400$ ft./sec.  $L = 1$ ft. 9 in.
5000 r.p.m., $f = 249$ cps., $V = 1500$ ft./sec.  $L = 1$ ft. 6 in.
6000 r.p.m., $f = 300$ cps., $V = 1550$ ft./sec.  $L = 1$ ft. 4 in.
7000 r.p.m., $f = 351$ cps., $V = 1600$ ft./sec.  $L = 1$ ft. 1½ in.
8000 r.p.m., $f = 399$ cps., $V = 1700$ ft./sec.  $L = 1$ ft. ¼ in.

Since the lengths calculated by both formulas agree almost exactly, both resonance and correct pulse arrival are assured. Where minor differences occur, the lengths determined by Formula II are used.

The second calculation above in each of Examples I and II, for length of intake tract, was made to determine whether resonance could or could not be achieved to provide an increase in sound pressure amplitude. In Example I it was not achieved exactly, but in Example II resonance was achieved, for all practical purposes. The second calculation is thus relevant in that, by adjusting variable factors (such as the number of cylinders using common intake and exhaust pipes, intake or exhaust-pipe frequency or overtone) it may be possible to achieve resonance.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit or scope of the invention as set forth in the appended claims.

I claim:

1. Apparatus for beneficially affecting the performance of an internal combustion engine having a crankshaft, comprising air intake means for forming a cylindrical gas column, said air intake means having one end thereof connected to said engine, exhaust means for forming another cylindrical gas column, said exhaust means having one end thereof connected to said engine, means for varying the acoustical length of at least one of said gas columns while the engine is running, transducer means operatively connected adjacent one of said ends for issuing sound pulses, and control means connected to said transducer means for regulating the frequency of said pulses in accordance with the rotary speed of said crankshaft.

2. Apparatus according to claim 1, and including resonator means operatively connected adjacent one of said ends for amplifying sound waves occurring in a corresponding gas column.

3. Apparatus for increasing power output and efficiency of an internal combustion engine, comprising air intake means having a cylindrical portion therein for forming a cylindrical gas column, means forming longitudinally spaced apertures in said cylindrical portion, cover means slidably mounted for axial movement relative to said cylindrical portion for sequentially covering and uncovering said apertures, and means for slidably adjusting the axial position of said cover means so as to adjust the acoustical length of said gas column.

4. Apparatus for increasing power output and efficiency of an internal combustion engine having an air intake port, comprising air intake means having a cylindrical portion therein operably connected to said port for forming a cylindrical gas column, means forming longitudinally spaced apertures in said cylindrical portion, said apertures each having a diameter at least as great as one-half the diameter of said cylindrical portion of said air intake means, cover means slidably mounted for axial movement relative to said cylindrical portion for sequentially covering and uncovering said apertures, rod means connected to said cover means for slidably adjusting the axial position of said cover means, and control means for longitudinally shifting said rod means in accordance with the speed of said engine.

5. Apparatus for increasing power output and efficiency of an internal combustion engine having an air intake port, comprising air intake means having a cylindrical portion therein operably connected to said port for forming a cylindrical gas column ahead of said intake port, means forming longitudinally spaced apertures in said cylindrical portion, cover means slidably mounted relative to said spaced apertures for sequentially covering and uncovering the latter, rod means connected to said cover means for slidably adjusting the longitudinal position of said cover means, control means for shifting said rod means in accordance with the speed of said engine, sound generator means connected to said air intake means in proximity to said intake port for issuing sound pulses into said intake port, and control means operatively connected to said generator means for controlling the frequency of said pulses in accordance with the speed of said engine.

6. Apparatus according to claim 5, said generator means comprising a transducer for converting electrical energy to sound energy, said control means comprising cam means adapted to be rotated at the speed of the engine crankshaft, cam follower means, switch means actuable by said follower means, and a source of electrical current connected to said switch means and to said transducer.

7. Apparatus for increasing power output and efficiency of an internal combustion engine having an exhaust port, comprising exhaust means having a cylindrical portion therein operably connected to said port for forming a cylindrical gas column behind said port, sleeve means forming a telescopically extensible portion of said exhaust means for changing the acoustical length of said gas column, and control means for regulating the longitudinal position of said sleeve means, sound generator means connected to said exhaust means in proximity to said exhaust port for issuing sound pulses into said exhaust port, and control means operatively connected to said generator means for controlling the frequency of said pulses in accordance with the speed of said engine.

References Cited by the Examiner

UNITED STATES PATENTS

| | | | |
|---|---|---|---|
| 1,384,414 | 7/1921 | Fulton | 60—54.5 X |
| 2,102,559 | 12/1937 | Kadenacy | 60—32 |
| 2,305,946 | 12/1942 | Wilson et al. | 60—29 X |
| 2,835,235 | 5/1958 | Gassmann. | |
| 2,894,497 | 7/1959 | Bolles. | |

FOREIGN PATENTS

| | | |
|---|---|---|
| 431,856 | 7/1935 | Great Britain. |
| 442,940 | 2/1936 | Great Britain. |
| 537,040 | 6/1941 | Great Britain. |

OTHER REFERENCES

German printed application No. 1,049,149, January, 1959.

German printed application No. 1,055,877, April 1959.

SAMUEL LEVINE, *Primary Examiner.*

EDGAR W. GEOGHEGAN, *Examiner.*

A. S. ROSEN, *Assistant Examiner.*